United States Patent [19]

Filss

[11] 4,214,881
[45] Jul. 29, 1980

[54] DEVICE FOR CLEANING HOT GASES

[75] Inventor: Peter Filss, Jülich, Fed. Rep. of Germany

[73] Assignee: Kernforschungsanlage Jülich Gesellschaft mit beschränkter Haftung, Jülich, Fed. Rep. of Germany

[21] Appl. No.: 888,002

[22] Filed: Mar. 20, 1978

[30] Foreign Application Priority Data

Mar. 19, 1977 [DE] Fed. Rep. of Germany ....... 2712216

[51] Int. Cl.² ............................................. B01D 47/06
[52] U.S. Cl. ...................................... 55/228; 55/232; 55/234
[58] Field of Search ................. 55/228, 230, 231, 232, 55/234

[56] References Cited

U.S. PATENT DOCUMENTS

| 17,448 | 1/1857 | Pantz | 55/232 |
|---|---|---|---|
| 879,219 | 2/1908 | Towns | 55/230 |
| 3,353,337 | 11/1967 | Gale | 55/232 |
| 3,907,967 | 9/1975 | Filss | 55/232 |
| 4,036,597 | 7/1977 | Filss | 55/232 |

FOREIGN PATENT DOCUMENTS 466036 7/1975 U.S.S.R. .................... 55/230

*Primary Examiner*—Frank Sever
*Attorney, Agent, or Firm*—Becker & Becker, Inc.

[57] ABSTRACT

A method of and device for cleaning hot gases, especially industrial waste gases, according to which the gases to be cleaned are passed between plates or discs rotatable about an axis and arranged in spaced relationship to each other, e.g. spaced from each other by a few millimeters. At least one component to be separated from the gases to be cleaned is adapted to form a compound with a layer of a solid substance which has been deposited upon the surface of the plates as a liquid, especially as an aqueous solution, and has been dried. The solution forming the layer of solid substance is sprayed upon the plate surface or at least portions thereof. After reaction of the layer of solid substance with the gases, the layer of solid substance is at least partially withdrawn from the gas space between the respective adjacent plates.

6 Claims, 2 Drawing Figures

DEVICE FOR CLEANING HOT GASES

The present invention relates to a method of cleaning or purifying hot gases, especially industrial waste gases, according to which the gases are conveyed between plates or discs which rotate about an axis and which are spaced from each other by a few millimeters. According to this method, at least one component to be separated from the gases forms a compound with a dried layer of solid material which in the form of a liquid, especially an aqueous solution, is applied to the surface of the plates or discs, and the layer of solid material is, following its reaction with the gases, removed from the plates or discs.

Numerous methods and devices have become known for separating impurifications and harmful substances from industrial waste gases. The methods utilized in this connection depend on the chemical properties and the degree of dispersion of the impurifications to be separated. As far as the separation of molecular disperse impurifications of gases is involved, frequently wet purifying methods have heretofore been utilized. In this connection, the gases to be cleaned or purified were cooled and were loaded with moisture. This method has the drawback that additional steps have to be taken in order to impart upon the gases the necessary buoyancy for their emission into the atmosphere. Furthermore the loading with aerosols represented a further drawback which loading generally occurred in view of the liquid washing substances utilized in connection with the wet purification, because this leads to an undesired ecological effect.

Methods are also known for separating useful substances from flue gases or for separating admixtures, according to which the gases were passed along plates which were partly immersed in water or in a chemical liquid and which rotate at low speed in such a way that they remain continuously moistened by the liquid. According to this method, the particles suspended in the gases are supposed to adhere to the plates or discs (see German Pat. No. 34 324, German Offenlegungsschrift No. 1 546 649). These methods, however, are limited to the utilization of liquid sorption means (wet purification).

Methods are also known for purifying gases by means of solid materials. Thus, German Pat. No. 499 652 discloses a method for purifying carbon dioxide containing gases of volatile iron compounds by conveying the gases over lime or barium oxide, according to which the solid materials utilized for the purification are renewed in a discontinuous manner. This drawback is avoided by a heretofore known method disclosed in U.S. Pat. No. 4,036,597—Filss dated July 19, 1977 belonging to the assignee of the present invention and corresponding to German Auslegeschrift No. 2 236 389. According to this method, the harmful substances are chemically bound to layers of solid material which are formed continuously on rotating plates or discs and which are removed therefrom. In this connection, the rotating plates move through a bath of a solution which moistens the plates, and the adhering film of the solution is dried above the surface of the liquid by heat. For drying the film of the solution, advantage can be taken of the hot gases to be purified. The temperature differences between the surface areas of the plates carrying the layers of solid material and the areas of the plates immersed in the liquid bath must not have a random value.

It is, therefore, an object of the present invention to provide a method of and a device for purifying hot gases by means of layers of solid material which are formed on rotating plates or discs, according to which the differences in temperature between the areas of the plates located in the reaction zone and the areas of the plates located in the layer or coating zone are reduced.

This object and other objects and advantages of the invention will appear more clearly from the following specification in connection with the accompanying drawings, in which.

Figure 1:
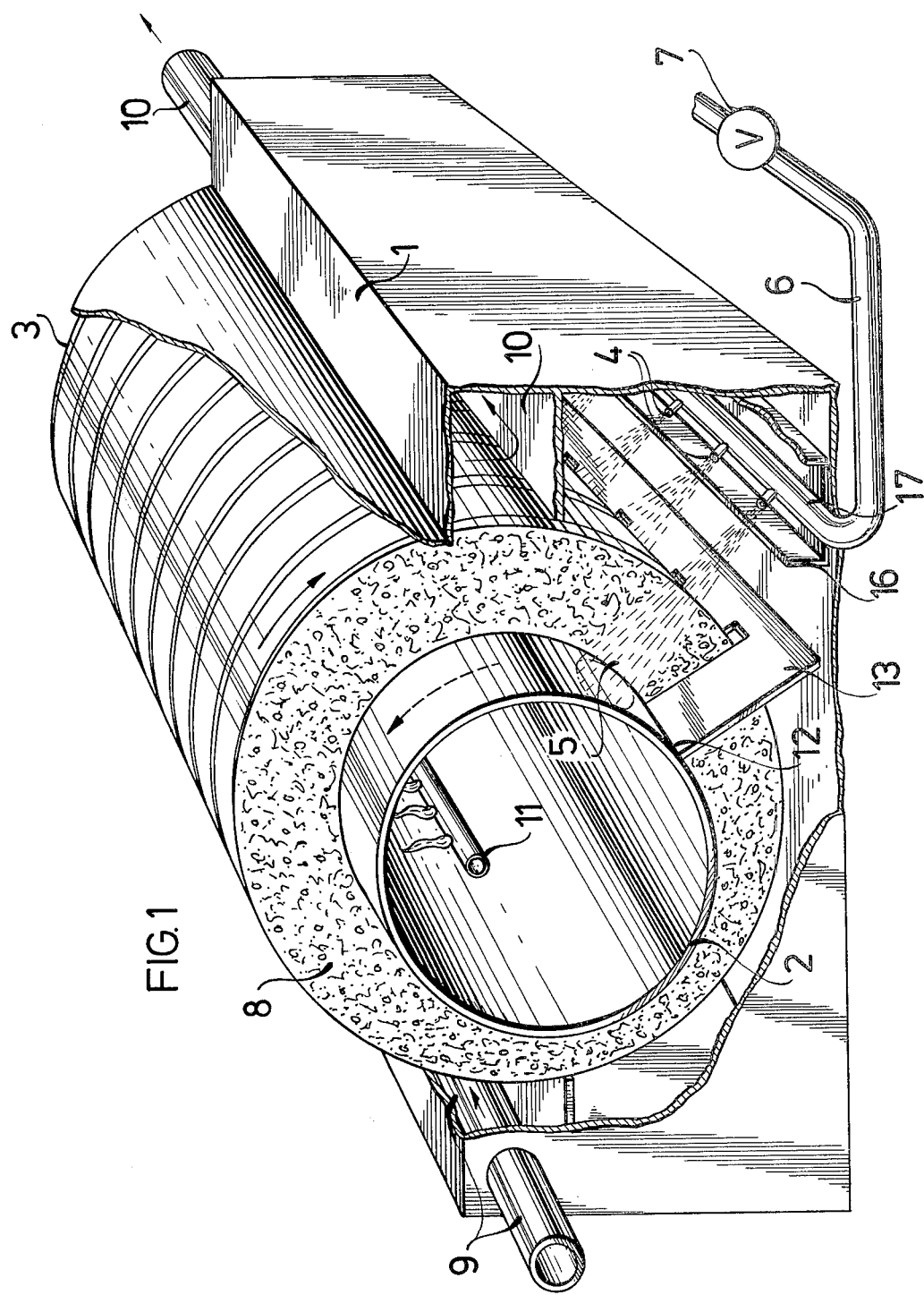
FIG. 1 is a perspective view of a device according to the invention.

The method according to the present invention is characterized primarily in that the solution forming the layer of solid material is sprayed onto the plate surface or at least onto parts thereof, and is furthermore characterized in that the layer of solid material is, after its reaction with the gases, at least partially removed within the space passed through by the gas.

By the spraying of the solution a strong cooling off of the entire plate during the application of a film of the solvent is avoided and the layer zone is reduced relative to the total surface of the plate. This brings about a reduction of the mean temperature differences on the plates while respectively the local mean temperatures of the plates are created by conveying the temperature distribution over the plate thickness. In addition thereto, the total surface of the layer of solid material which is available for the reaction with the gases is increased from which fact the economy of the plant greatly benefits. The layer of solid material is either entirely or partially removed in the space passed through by the gases, while, if necessary, still usable portions of the solid material remain on the plates.

According to a further development of the method according to the invention, it is provided to spray the surface of the plates with a plurality of solutions each of which forms a compound with at least one component to be separated from the gases. In this way it is possible simultaneously to apply solutions as layer of solid material which solutions as liquids are not compatible with each other and, for instance, might coagulate, and it is furthermore possible simultaneously to separate different components of the gases to be purified which components otherwise would have to be removed in different serially arranged purification plants.

Favorable surface structures in the layer of solid material are realized due to the fact that the utilized solution or at least one of the utilized solutions contains additional substances which during the concentration by evaporation and, as the case may be, during the gas purifying reaction form a gel having a structure rich in pores and having a skeleton structure. A typical representative of such substance is waterglass. For setting the desired reaction temperature, the plates are entirely or partially heated or cooled. A temperature control is advantageous particularly within the region of the coating zone of the plates. The formation of a layer of solid material by spraying the solution upon the plates will not be successful when, after exceeding a limit temperature on the plate surface during the impact of the droplets of the solvent, in view of excessive steam formation, no film of the solvent will form (Leidenfrost phenomenon). Therefore, the invention provides that the surface temperature of the plates within the region of the spraying of the solution or solutions is kept below the limit temperature which is needed for the moistening of the plate surface with the solution having the lowest boiling point. The limit temperature lies above the boiling temperature of the solution with the lowest boiling point and is, among others, dependent on the surface quality of the materials. The limit temperature is empirically ascertained.

A further advantageous development of the method according to the invention consists in that the solution or at least one of the solutions is at time intervals sprayed upon the plates. In this connection, the respective quantity of liquid to be sprayed is proportioned in conformity with the layer of solid material forming on the plates. At the same time it is preferred so to set the quantity of liquid that the layer of solid material which is to be separated from the plates can be removed from the plate surface in slightly moistened condition.

For practicing the method according to the invention, a device is particularly suited which comprises a pipe rotatably arranged in a container-shaped housing. Located on this pipe in serially spaced relationship of a few millimeters from each other are circular plates. Such device furthermore comprises a gas feeding chamber extending parallel to the axis of the pipe, and a gas discharge chamber while, for the purpose of cleaning the plates, scrapers are provided which extend into the spaces between the plates and contact the plate surfaces.

The device according to the present invention is characterized primarily in that stationarily arranged in the housing there is provided a plurality of spray nozzles connected to a feeding line for a liquid, especially an aqueous solution. These spray nozzles are so arranged that the plates are adapted, in a spraying zone which in the direction of rotation of the plates follows the scrapers, entirely or partially to be moistened by the liquid or solution, and that the scrapers with the exception of a slight gap lead to the pipe and are connected to a mount which forms a separating surface impeding the gas flow and extending to the wall of the housing. The liquid or aqueous solution contains such soluble compounds which chemically bind the harmful substances contained in the gases to a solid surface layer. The solution sprayed upon the plates dries in view of the residual heat of the plates and at the latest when contacting the hot gases to be purified. The solid surface layer reacts with the harmful substances to be removed from the gases and is thereby exhausted. The exhausted layer is scraped off by means of the scrapers. Subsequently, the rotating plates are sprayed again with a fresh solution. The removal of the layer of solid material is customarily effected in a continuous manner by the rotating plates while the used up and scraped off solid material trickles downwardly along the scrapers and is discharged from the bottom of the housing.

A preferred embodiment of the device according to the invention consists in that the spray nozzles are arranged on a tube which extends parallel to the axis of the pipe and which feeds the liquid or solution to be sprayed. This tube is arranged in a vat which is likewise filled with liquid in such a way that the spray nozzles are covered by the liquid in the vat. In this way crust deposits on the nozzle mouths will be avoided. In an advantageous manner liquids or solutions of different compositions can be introduced into the tube and the vat. The vat may, for instance, be filled with water.

In the feeding line for the liquid to the spray nozzles, there are preferably provided throughflow valves which can intermittently be opened and closed. The spray nozzles may be combined in groups while each group has associated therewith a throughflow valve which can be controlled independently of the other throughflow valves.

Favorable conditions for the spraying of the solution can be obtained by making the diameter of the pipe larger than one third of the diameter of the plates. In order to prevent that the gases to be purified will be unduly charged with evaporated solvent, it is advantageous to provide cooled steam condensers in the region of the spraying zone. A cooling of the plates will be realized from the outer rim by immersing the outer rims of the plates into a liquid bath at the bottom of the housing. Preferably also the mount of the scrapers is cooled.

The method and device according to the present invention are well suited for separating molecular disperse harmful substances and impurifications from air or from $CO_2$-containing waste gases, especially for substances having a typically sour character, such as HCl, $SO_2$ and nitric oxides.

Referring now to the drawings in detail, on a pipe 2 rotatably journalled in a housing 1 there is provided a plurality of circular plates 3 which are spaced from each other by only a few millimeters. The pipe 2 and the plates 3 form a rigid unit and rotate at a speed of, for instance, ten revolutions per hour. By means of spray nozzles 4 arranged in the lower region of the housing 1, the plates 3 within a spray zone 5 are sprayed with a solution which is conveyed to the nozzles 4 through a feeding line 6. The solution dries quickly on the moistened plates in view of the contact with the flow of hot gases. In this way there is generated on the plates 3 a layer 8 of solid material which is capable of reacting with the gases to be purified. The gas to be purified flows from a gas feeding chamber 9 which extends alongside the plates 3 in housing 1 parallel to the axis of the pipe 2 into the upper region of the plates 3 and is conveyed along the layer 8. In this way the harmful substances to be removed from the gas are bound by reaction to the layer of solid material. The purified gas is collected in a gas discharge chamber 10 arranged on the other side of the plates 3 and flows off.

Figure 2:
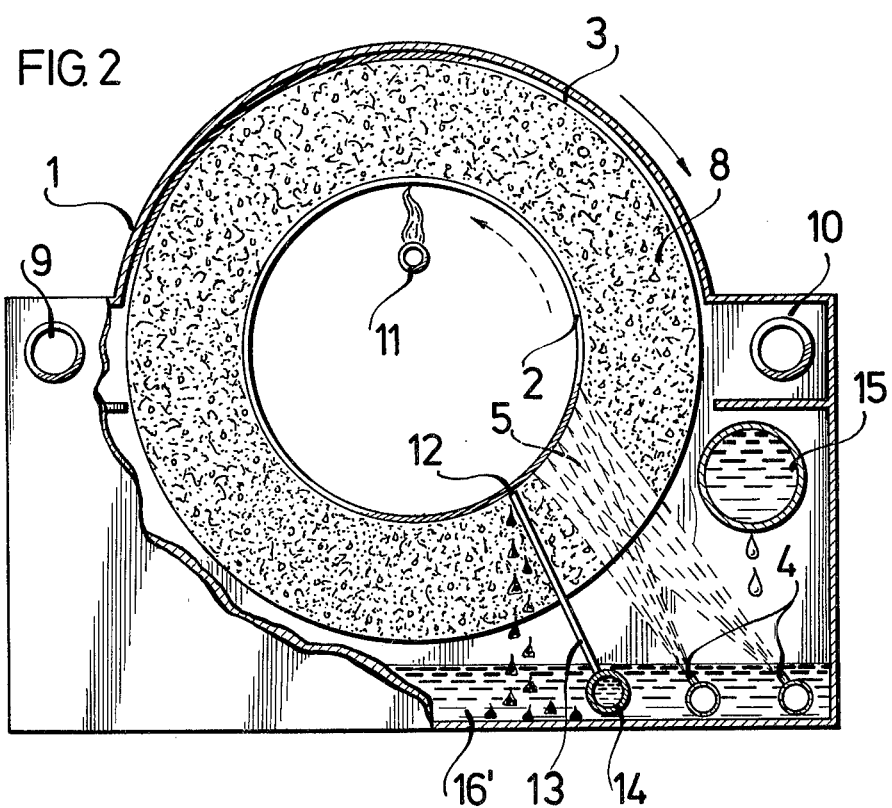
FIG. 2 is a fragmentary cross section through a device of a type similar to that of FIG. 1 but provided with additional auxiliary devices.

The rotary movement of the plates 3 is preferably effected in a direction indicated by dash line arrows which direction is opposite to the direction of the incoming gas, whereas the direction of flow of the gases in FIGS. 1 and 2 is indicated by solid lines.

The direction of rotation of the plates and the direction of flow of the gases may, however, if this should be expedient, also be effected in the same sense. The drive of and the support for the pipe 2 are arranged outside the housing 1 (not shown in the drawings). If the pipe 2 is under such a load by the plates 3 that an undesired bending of the pipe might occur, it is suggested, within the housing of pipe 2, to provide supporting rollers or the like (not shown). The pipe 2 is adapted to be heated or cooled. In the specific embodiment shown, for instance, a gas line 11 is provided for heating pipe 2, which gas line is provided over its length with burner stations. Instead of heating by gas, also electric heating or hot steam heating or hot air heating may be provided for pipe 2.

The layer of solid material used up by the reaction with the harmful substances contained in the gases is removed from the plates 3 by scrapers 12. The scrapers designed as blades or the like are arranged on a mount 13 and, in a comb-like manner, extend into the spaces between the plates. The spacing of the scrapers 12 from the pipe 2 is only minor. The scrapers 12 and the mount 13 extending up to the wall of housing 1 simultaneously form a separating surface which impedes the gas flow in the lower region of the plates. The scrapers 12 are advantageously arranged directly below the spray zone 5 whereby a removal of the layer of solid material in moist condition will be made possible and interfering dust development will be avoided. In the embodiment of FIG. 2, a cooling water pipe 14 is provided for cooling the mount 13.

To prevent an undue humidification of the gas to be purified by the spraying of the liquid of the solution, in the embodiment of FIG. 2 a steam condenser 15 is arranged above the spray zone 5. This steam condenser 15 is expediently cooled by water. The quantity of solvent collected on the steam condenser 15 flows off into a vat 16' which is filled with a liquid. Arranged in the vat is a pipe 17 which comprises the spray nozzles 4 and which conveys the liquid to be sprayed. The spray nozzles extend to below the liquid level in vat 16 to prevent the formation of a crust at the mouths of the nozzles.

FIG. 2 shows a vat 16' which extends along the bottom of housing 1 and is intended for receiving a liquid. As such liquid, there may be used water. Depending on the specific application, it is advantageous to design the entire bottom of housing 1 as liquid receiving vat so that the outer rim portions of the plates may, for purposes of being cooled, immerse into the liquid bath.

The device diagrammatically and by way of example illustrated in the drawings is equipped with plates having a thickness of about 5 mm and an outer diameter of about 90 mm. The plates are fixedly arranged in spaced relationship to each other on a pipe having a diameter of about 50 mm; the spacing between the plates amounted to about 5 mm. The spacing of adjacent plates from each other in the axial direction of pipe 2 may be within the range of from 2 to 10 mm. Principally, the distance between the plates is so selected that after the layer of solid substances has been applied onto the plates 3, there will remain sufficient space between adjacent plates 3 to allow the gases to be purified to flow through said last mentioned space so as to be able to react with the said layer. The plates and the pipe are made of a chromium nickel steel alloy. The surfaces of the plates were pickled. The total surface available for the formation of the layer of solid material amounts to about 800 cm$^2$. For applying the film of the solvent, there are provided ten nozzles which spray the solution intermittently. With a speed of rotation of 6 revolutions per hour and a requirement of solvent of 1 ml per 20 cm$^2$ of surface, the surface of the plates is sprayed about ten times per revolution and for a period of one second. In the spray zone a surface temperature of about 150° C. is maintained. The limit temperature at which the plates can no longer be covered amounted to about 180° C. On the plate surface there formed a continuous closed layer of solid substances. The spraying frequency and the spraying time are in addition to being dependent from the speed of revolution of plates 3 also dependent from the type of the solution to be sprayed, especially from the concentration and viscosity of the solution. Assuming e.g. a speed of rotation of the plates 3 of six revolutions per hour and a solution consumption of 1 milliliter per twenty cm$^2$ surface the solution will be sprayed onto the plates 3 about every ten seconds for a period of from 1 to 3 seconds.

EXAMPLE 1

$SO_2$-containing air was purified. The content of harmful substances amounted to 1500 ppm $SO_2$. For forming the layer of solid material a solution was employed which per liter of aqueous solution contained 100 g NaOH and 100 ml waterglass. With the above indicated device, with a throughput of 200 l/h of gas to be purified, an $SO_2$-content of 15 ppm was measured at the gas outlet. With throughput of 500 l/h, the $SO_2$-content in the flowing-off gas amounted to 200 ppm.

EXAMPLE 2

Carbon dioxide gas with an impurification of 1600 ppm was purified. For forming the layer of solid material a solution was employed which per liter of aqueous solution contained 53 g $Na_2CO_3$ and 10 ml waterglass. In the same device, with a throughput of 100 l/h of gas to be purified, a HCl-content of about 10 ppm was measured at the gas outlet. With a throughput of 200 l/h, the HCl-content in the flowing-off gas amounted to 60 ppm.

It is, of course, to be understood that the present invention is, by no means, limited to the specific showing in the drawings and the method described in the specification, but also encompasses any modifications within the scope of the appended claims.

What I claim is:

1. A device for purifying a hot gas, especially industrial waste gas, which includes in combination: a housing, a tubular member rotatably arranged in said housing, a plurality of circular plates fixedly connected and arranged in spaced relationship to each other on said tubular member for rotation with the latter, gas feeding means arranged on one side of said tubular member and extending substantially parallel to the axis of said tubular member for feeding a hot gas to be purified into the spaces respectively defined by each two adjacent plates, gas discharge means arranged on and extending along the other side of said tubular member opposite said gas feeding means and communicating with the space between said plates for withdrawing gas having passed between said plates, scraper means for cleaning said plates, said scraper means respectively extending into the spaces between each two adjacent plate means and stopping short of the outer periphery of said tubular member, a feeding line adapted to be connected to a supply of spray liquid, a plurality of spray nozzles arranged within said housing and connected to said feeding line for respectively spraying spray liquid into the space between said plates, said last mentioned space defining an effective spray zone arranged past the respective scraper when looking in the direction of rotation of said plates, supporting means arranged within said housing and supporting said scraper means directly below the spraying zone while forming partition means impeding the flow of gas to be cleaned which flows only in the upper region of the housing near said spray zone and extending up to the wall of said housing in an arrangement to avoid removed particles being taken by the flow of gas, said feeding line having a section extending within said housing and substantially parallel to the axis of said tubular member, said section supporting said spray nozzles, and a vat likewise arranged within said housing and having said section with said nozzles arranged therein, said vat being dimensioned to receive liquid to a fluid level completely covering up said nozzles to a depth sufficient to avoid blockage thereof by particle deposits while maintaining said effective spray zone.

2. A device in combination according to claim 1, which includes throughflow valves interposed in said feeding line and operable intermittently to be opened and closed.

3. A device in combination according to claim 1, in which the diameter of said tubular member is in excess of one third of the diameter of said plates.

4. A device in combination according to claim 1, which includes a steam condenser arranged within the region of said spray zone.

5. A device in combination according to claim 1, which includes cooling means for cooling said supporting means.

6. A device in combination according to claim 1, which includes a tank arranged at the bottom of said housing, and adapted to receive and store cooling fluid, the rim portion of said plates extending into said tank so as to be cooled when said tank is correspondingly filled with a cooling fluid.

* * * * *